(12) United States Patent
Donnenwirth

(10) Patent No.: US 7,648,021 B1
(45) Date of Patent: Jan. 19, 2010

(54) METHOD AND MANUFACTURE, REFURBISHMENT, AND REPAIR OF NON-MOLDABLE POLYURETHANE/POLYUREA CONVEYOR BELT COVERS AND RELATED PRODUCTS

(75) Inventor: Joel Donnenwirth, Paragould, AR (US)

(73) Assignee: Garlock Rubber Technologies, Paragould, AR (US)

( * ) Notice: Subject to any disclaimer, the term of this patent is extended or adjusted under 35 U.S.C. 154(b) by 0 days.

(21) Appl. No.: 12/126,565

(22) Filed: May 23, 2008

Related U.S. Application Data

(60) Provisional application No. 60/941,371, filed on Jun. 1, 2007.

(51) Int. Cl.
 *B65G 15/32* (2006.01)
(52) U.S. Cl. .................... 198/847; 198/844.1
(58) Field of Classification Search ............. 198/844.1, 198/846, 847
See application file for complete search history.

(56) References Cited

U.S. PATENT DOCUMENTS

| | | | | |
|---|---|---|---|---|
| 5,941,369 | A * | 8/1999 | Katsura et al. | 198/847 |
| 6,561,344 | B1 * | 5/2003 | Basse | 198/844.1 |
| 6,666,326 | B2 * | 12/2003 | Hymes et al. | 198/846 |
| 6,994,209 | B2 * | 2/2006 | Cediel et al. | 198/847 |
| 7,419,050 | B2 * | 9/2008 | Westerkamp et al. | 198/847 |
| 7,438,178 | B2 * | 10/2008 | Chahal et al. | 198/847 |

* cited by examiner

*Primary Examiner*—Mark A Deuble
(74) *Attorney, Agent, or Firm*—Holland & Hart LLP

(57) ABSTRACT

A method of applying a coating to a conveyor belt is provided. A first layer of adhesive is applied to a first surface of the conveyor belt and allowed to cure. One or more subsequent layers of adhesive are applied to the first layer of adhesive; a final layer of the one or more subsequent layers is allowed to become tacky. In some embodiments the adhesive is a two-part cement. In particular embodiments, the two-part cement includes an isocyanate part and a curable rubber part. A layer of two-part polyurethane/polyurea is applied to the tacky layer of adhesive. The coating process may be performed on conveyor belts having worn or damaged portions in an effort to repair the conveyor belts.

20 Claims, 4 Drawing Sheets

METHOD AND MANUFACTURE, REFURBISHMENT, AND REPAIR OF NON-MOLDABLE POLYURETHANE/POLYUREA CONVEYOR BELT COVERS AND RELATED PRODUCTS

CROSS-REFERENCE TO RELATED PATENT APPLICATIONS

The invention claims priority from U.S. Provisional Patent Application No. 60/941,371 entitled METHOD OF MANUFACTURE, REFURBISHMENT, AND REPAIR OF NON-MOLDABLE POLYURETHANE/POLYUREA CONVEYOR BELT COVERS AND RELATED PRODUCTS by Joel Donnenwirth, filed on Jun. 1, 2007, which Provisional Patent Application is hereby incorporated by reference in its entirety.

BACKGROUND

Conveyor belts are well-known products used to move objects over varying distances by way of wrapping the belt around multiple rotating cylinders or drums, and turning the drums, thereby causing the belt to traverse the distance between the drums at either end of the belt. Items can then be loaded onto the belt and moved over the distance traversed by the belt. Common conveyor belt construction includes a length of high-strength fabric with a layer of rubber applied to an upper surface of the fabric. Typically, the rubber is adhered to the fabric with an adhesive. The thickness of one or more layers of rubber may vary depending on the intended application, but may generally fall in the range of approximately 5 to 750 thousandths of an inch (mil). Though, some particularly stressful or harsh environments may include one or more layers of rubber having a thickness of greater than approximately 750 mil. Once the layer of rubber cures, the conveyor belt is ready for assembly and use.

Conventional conveyor belts are prone to wear and failure resulting from high temperatures or transporting caustic substances. Once a belt has become worn, they must be discarded as the vulcanized rubber is difficult to repair, although the fabric may be usable past the point the rubber is destroyed. In some instances, conventional belts may be covered with a molded urethane cover to improve their durability. However, such molded covers have very little flexibility and may not be suitable for use in many conveyor belt applications.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

Embodiments of the present invention comprise methods for applying a two-part spray polyurethane/polyurea to a conveyor belt to provide a durable conveyor belt cover, as well as methods for refurbishing worn conveyor belts, and repairing damaged polyurethane/polyurea conveyor belts. In one embodiment, a first layer of liquid two-part cement is applied to a conveyor belt, the first layer of cement is allowed to dry, and a second layer of cement is applied and allowed to get tacky. A layer of two-part spray polyurethane/polyurea is applied to the belt and allowed to dry. In another embodiment, a used conveyor belt has a polymer layer removed to expose a layer of rubber, and a first layer of liquid two-part cement is applied to the conveyor belt. After the first layer of cement dries, a second layer is added. After the second layer of cement becomes tacky, a layer of two-part spray polyurethane/polyurea is applied to the belt and allowed to dry.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
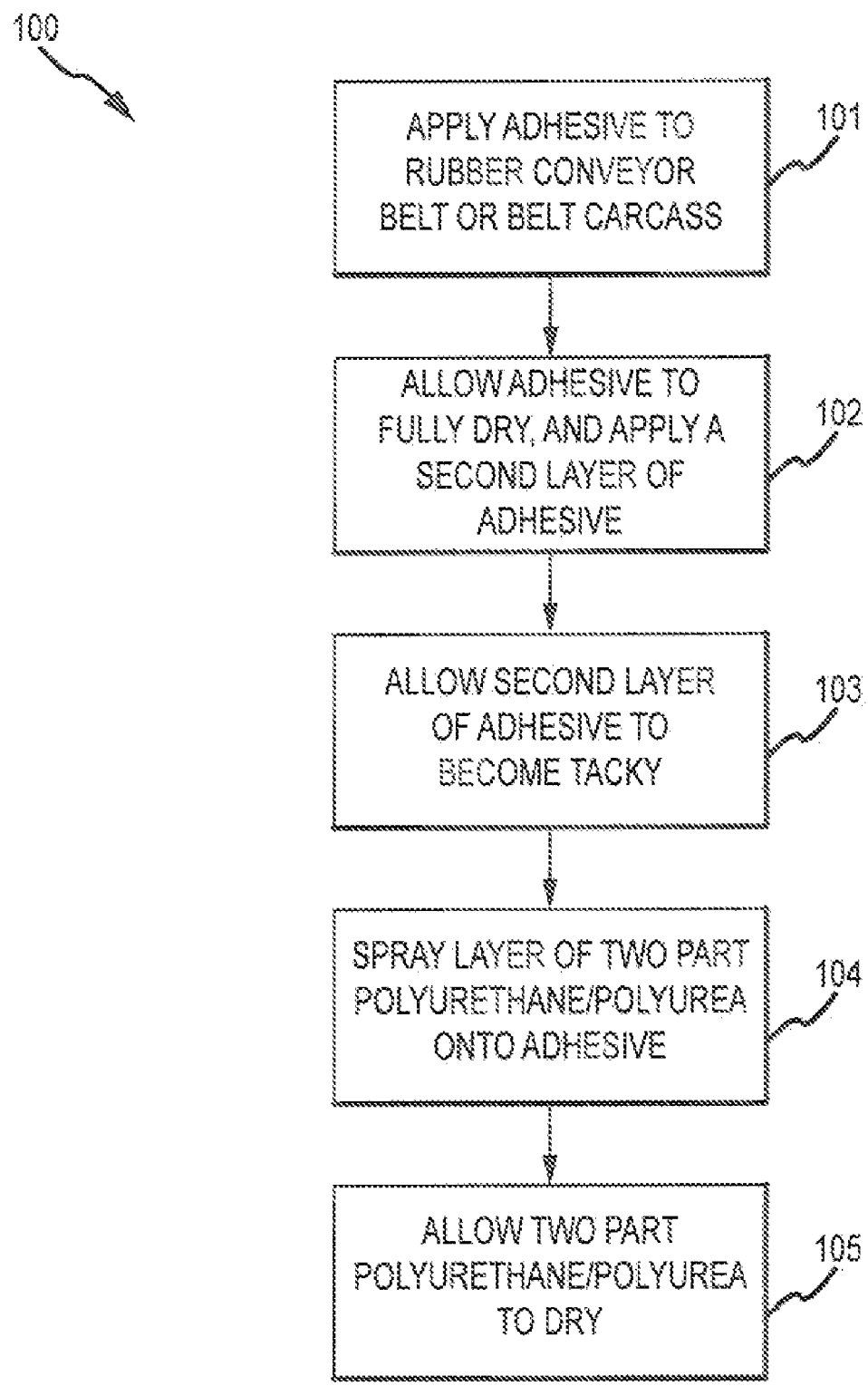
FIG. 1 shows a method for applying two-part spray polyurethane/polyurea to a conveyor belt according to one embodiment of the present invention.

Referring now to the drawings in which like numerals refer to like elements throughout the several figures, FIG. 1 shows a method 100 for applying a two-part spray polyurethane/polyurea coating to a conveyor belt. In one embodiment of the present invention, a length of high-strength fabric has a layer of rubber applied to it. In one embodiment, the rubber is adhered to the fabric with an adhesive. For example, in one embodiment, the cohesive agent comprises Casabond 1200. The layer of rubber cures to form a basic conveyor belt 12. The thickness of one or more layers of rubber may vary depending on the intended application, but may generally fall in the range of approximately 5 to 750 thousandths of an inch (mil). Though, some particularly stressful or harsh environments may include one or more layers of rubber of greater than approximately 750 mil. In step 101, after the rubber layer has cured, a first layer of adhesive 14 may be applied in sufficient quantity to coat the belt. In step 102, the first layer of adhesive 14 may be allowed to dry. In one embodiment, a two-part cement may be applied to the belt. For example, in one illustrative embodiment, the two-part cement comprises an isocyanate part and a curable rubber part. The cement may adhere and cross-link the upper rubber surface of the belt to bond the cement with the belt. As the cement reacts with the belt, it dries and a second layer of the cement 16 is applied. In one embodiment, more than two layers of cement may be applied. For example, in one embodiment, three layers of cement may be applied.

In the embodiment shown, the second layer of cement 16 begins to dry and becomes tacky 103. The adhesive may be regarded as tacky when it has begun to dry, but will still bond with another substrate layer, as is generally understood in the art. In this illustrative embodiment, it takes less than an hour for the cement to become tacky. While the cement described above includes a two-part rubber cement, such as Rena™ Tip Top SC-2000 cement, other suitable cements may be used as well. Further, time to become tacky may vary depending on the cement selected. Further, while a cement is used in this embodiment, any suitable adhesive may be used.

While the cement is tacky, a layer of two-part polyurethane/polyurea 18 may be sprayed onto the belt 104. In one embodiment, the layer of two-part spray polyurethane/polyurea 18 may be between approximately ¼ and 5/16 of one inch. However, in other embodiments, other thickness may be desirable. For example, a conveyor belt according to one embodiment of the present invention may comprise a layer of two-part spray polyurethane/polyurea 18 having a thickness of between approximately 5/16 to ¾ of an inch. Such an embodiment may be advantageous in an environment wherein the conveyor belt may be particularly susceptible to wear. The two-part spray polyurethane/polyurea 18 may adhere to the belt by way of the two-part cement, and may be allowed to dry 105. In this illustrative embodiment, the two-part spray polyurethane/polyurea has a durometer reading of between approximately 65 and 75 Shore A. In one embodiment, the two-part spray polyurethane/polyurea comprises ORPC 70-HA. However, other embodiments may comprise two-part spray polyurethane/polyurea having a durometer reading between approximately 60 and 80 Shore A. A further embodiment comprises two-part spray polyurethane/polyurea having a durometer reading of greater than 80 Shore A or less than 60 Shore A. The selection of two-part spray polyurethane/polyurea may depend on the amount of flexibility desired for the intended application for the conveyor belt. For example, an application requiring little flexibility may employ an embodiment of the present invention having a two-part spray polyurethane/polyurea layer comprising a less flexible, higher durometer reading, such as 80 Shore A or greater. Or, by spraying a two-part polyurethane/polyurea layer having a durometer reading of between approximately 65 and 75 Shore A, the belt may retain a flexibility similar to rubber, which may allow the belt to be wound around a pulley in a conveyor belt system. Further, the layer of two-part spray polyurethane/polyurea may provide a level of wear resistance and temperature resistance not found in conventional conveyor belts. Further, the application of a two-part polyurethane/polyurea layer by spraying may allow a belt to have a flexibility similar to that of a conventional conveyor belt.

Figure 2:
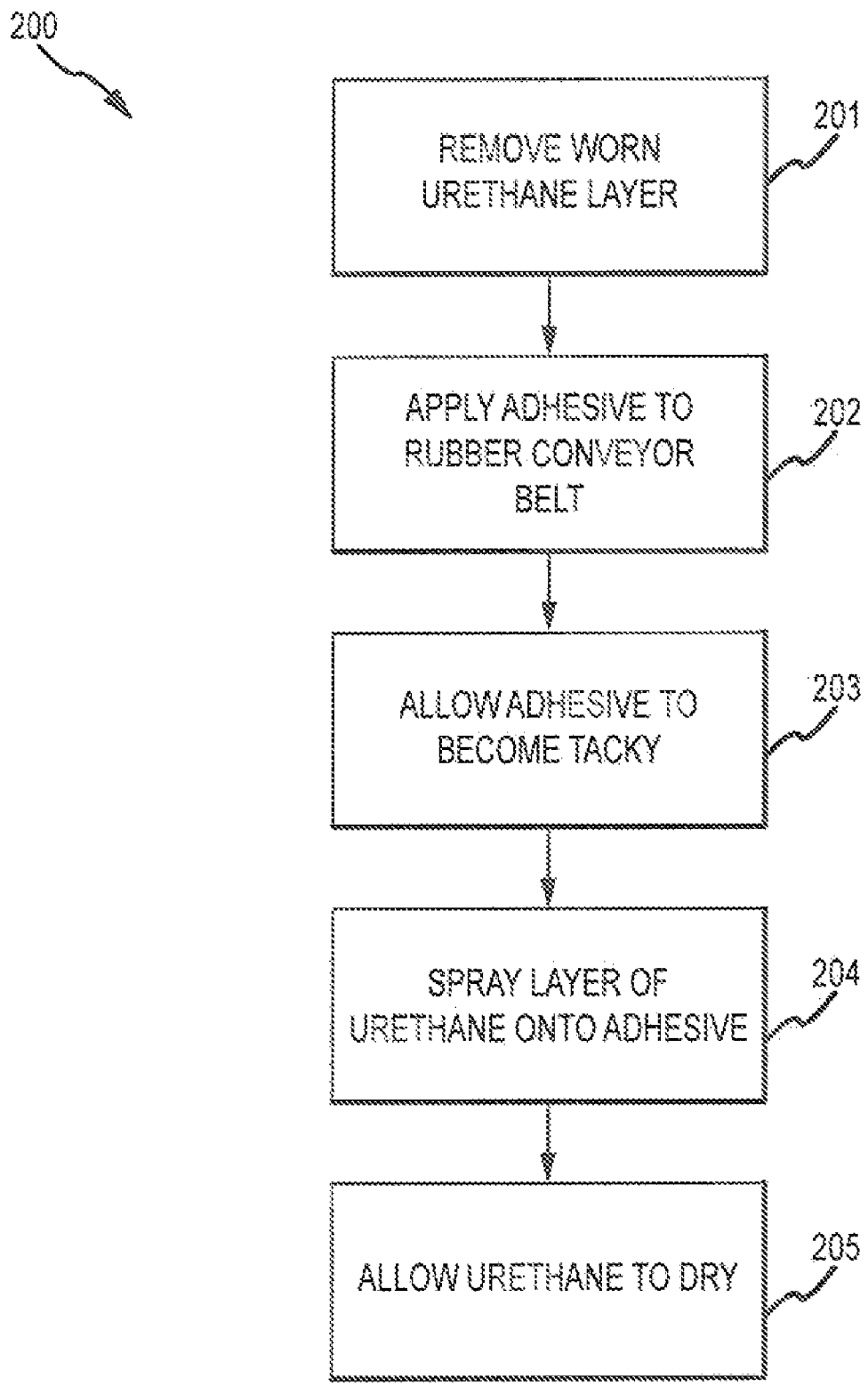
FIG. 2 shows a method for refurbishing a worn conveyor belt according to one embodiment of the present invention.

FIG. 2 shows a method 200 for refurbishing a worn conveyor belt according to one embodiment of the present invention. For example, a worn conveyor belt comprising any type of polymer that has been worn down or damaged, may be refurbished. The worn layer of polymer may be removed by grinding, buffing, dissolving, or otherwise removing 201 the layer of polymer from the conveyor belt, while leaving sufficient rubber to bond with a new layer of two-part spray polyurethane/polyurea. After the worn polymer is removed, a first layer of two-part cement, or other suitable adhesive, may be applied 202 to the rubber belt. After the first layer has dried, a second layer may be applied and allowed to get tacky. After the second layer of cement becomes tacky 203, a layer of two-part polyurethane/polyurea may be sprayed 204 onto the belt. The cement may adhere the layer of two-part spray polyurethane/polyurea to the belt, and, after the layer has been allowed to dry 205, the belt may be used again in the same application, or in a different application. The type of cement or two-part spray polyurethane/polyurea applied to the belt during the refurbishing process does not need to be the same type of cement or two-part spray polyurethane/polyurea used in the original, or previously-refurbished, belt. For example, a worn belt may comprise a two-part spray polyurethane/polyurea layer having a durometer reading of 65 Shore A. The refurbished belt may be configured with a two-part spray polyurethane/polyurea layer having a durometer reading of 80 Shore A. Such a process may allow the recycling and re-use of worn conveyor belts, which may allow a user of such belts to reduce the number of new belts that it must purchase.

Figure 3:
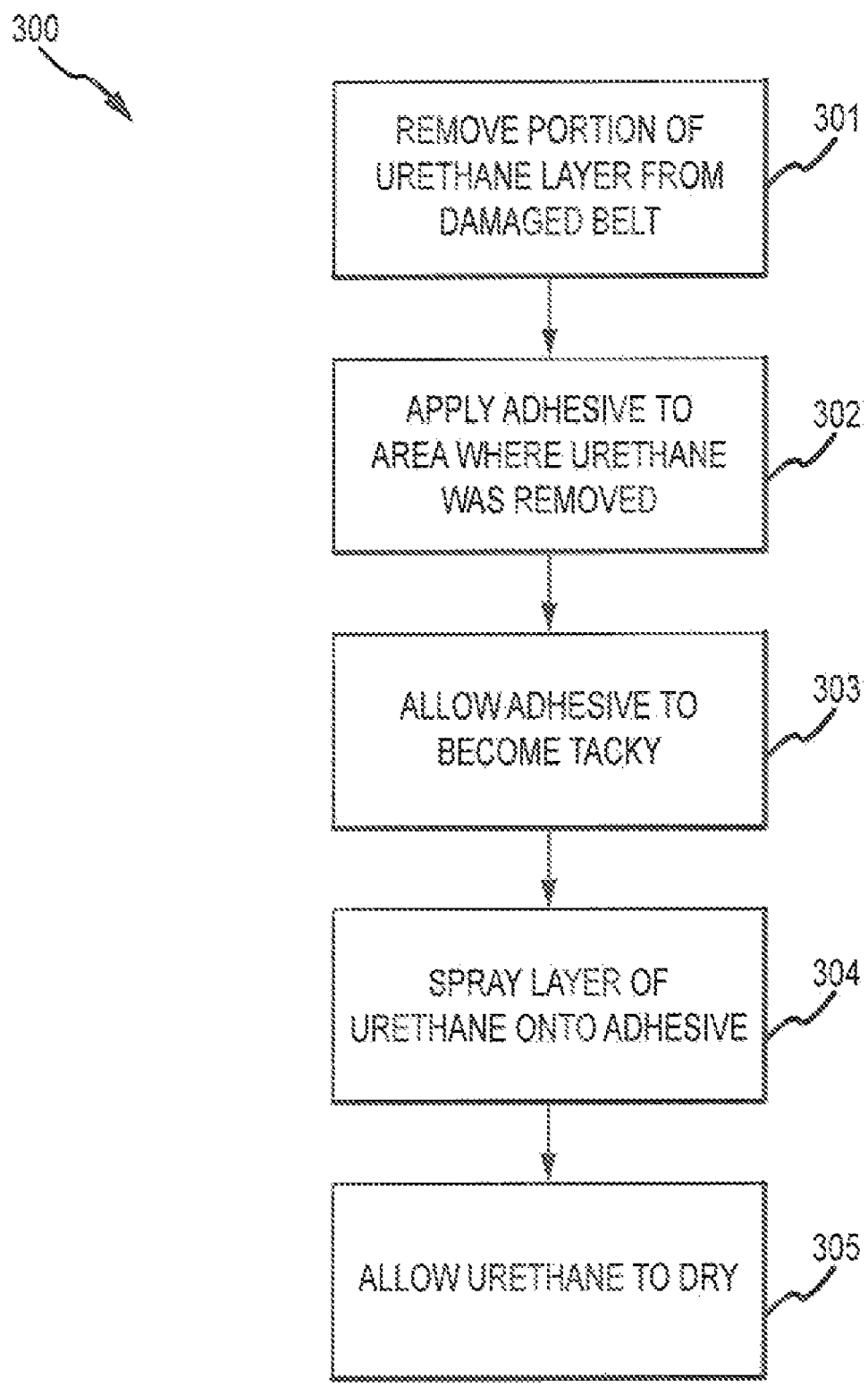
FIG. 3 shows a method for repairing a damaged conveyor belt according to one embodiment of the present invention.
Figure 4:
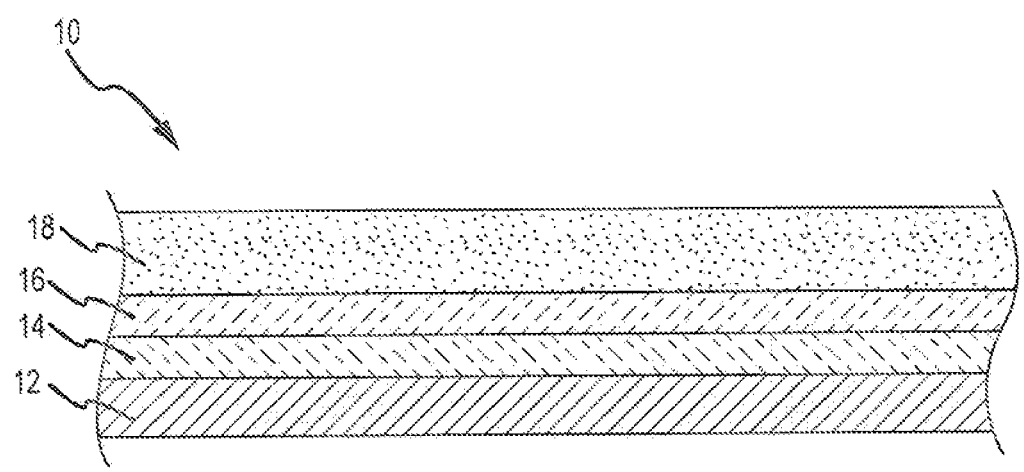
FIG. 4 shows a method for repairing a damaged conveyor belt according to one embodiment of the present invention.

FIG. 3 shows a method 300 for repairing a damaged conveyor belt according to one embodiment of the present invention. For example, if a conveyor belt having a two-part spray polyurethane/polyurea layer is damaged in a location, the location may be repaired according to embodiments of the present invention. For example, in one embodiment, the damaged portion of the two-part spray polyurethane/polyurea layer may be ground, buffed away, dissolved, or otherwise removed 301. Once the damaged portion of the two-part spray polyurethane/polyurea layer has been removed, a first layer of adhesive, such as a two-part cement, may be applied 302 to the belt at the location. After the first layer has dried, a second layer of adhesive may be applied. After the adhesive gets tacky 303, a layer of two-part polyurethane/polyurea may be sprayed 304 onto the location and allowed to dry 305.

In one embodiment, the new layer of two-part spray polyurethane/polyurea may have a durometer reading that is substantially the same as the two-part spray polyurethane/polyurea layer covering other portions of the belt. For example, if the belt is coated with a two-part spray polyurethane/polyurea layer having a durometer reading of approximately 70 Shore A, a repaired portion of the belt may be applied with a two-part spray polyurethane/polyurea layer having a durometer reading of approximately 70 Shore A. In one embodiment, the new layer may have a durometer reading substantially different than other portions of the belt. For example, a portion of the belt may be repaired with a two-part spray polyurethane/polyurea layer having a durometer reading of approximately 65 Shore A, while other portions of the belt may comprise two-part spray polyurethane/polyurea having a durometer reading of approximately 70 Shore A. Such an embodiment may be employed if two-part spray polyurethane/polyurea having a durometer reading substantially the same as the layer of two-part spray polyurethane/polyurea on the belt is not readily available, or for other reasons, such as a desired increased or reduced amount of flexibility in the repaired portion of the belt.

Although the system and method has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A method of applying a coating to a conveyor belt; the method comprising:
    providing a conveyor belt;
    applying a first layer of adhesive such that at least a portion of a first surface of the conveyor belt is coated with the first layer of adhesive;
    permitting the first layer of adhesive to dry;
    applying a second layer of adhesive to the conveyor belt, at least partially overlapping the first layer of adhesive;
    permitting the second layer of adhesive to become tacky; and
    applying a layer of two-part polyurethane/polyurea to the conveyor belt, at least partially overlapping the second layer of adhesive.

2. The method of claim 1 wherein:
    said first layer of adhesive is comprised of a two-part cement.

3. The method of claim 2 wherein:
    said two-part cement includes an isocyanate part and a curable rubber part.

4. The method of claim 2 wherein:
    the first surface of said conveyor belt is comprised of rubber; and
    said adhesive adheres and cross-links the first surface of the conveyor belt to bond the adhesive with the conveyor belt.

5. The method of claim 1 wherein:
    the layer of two-part spray polyurethane/polyurea is applied in a manner producing a layer approximately ¼ to 5/16 of one inch in thickness.

6. The method of clam 1 further comprising:
    the layer of two-part spray polyurethane/polyurea is applied in a manner producing a layer approximately 5/16 to ¾ of one inch in thickness.

7. The method of claim 1 wherein:
    the layer of two-part polyurethane/polyurea has a durometer reading of between approximately 65 and 75 Shore A.

8. The method of claim 1 wherein:
    the two-part polyurethane/polyurea comprises ORPC 70-HA.

9. The method of claim 1 wherein:
    the layer of two-part polyurethane/polyurea has a durometer reading between approximately 60 and 80 Shore A.

10. The method of claim 1 wherein
    the layer of two-part polyurethane/polyurea has a durometer reading of greater than 80 Shore A or less than 60 Shore A.

11. The method of claim 1 wherein:
    a portion of the fist surface of said conveyor belt is worn or damaged; and
    a portion of the worn or damaged portion of the first surface of said conveyor belt is removed prior to the step of applying the first layer of adhesive.

12. The method of claim 11 wherein:
    the portion of the worn or damaged portion of the first surface of said conveyor belt is removed by grinding, buffing, or dissolving the worn or damaged portion.

13. The method of claim 1 wherein:
    fist surface of said conveyor belt is comprised of a layer of two-part polyurethane/polyurea; said layer of two-part polyurethane/polyurea being worn or damaged; and
    a portion of the worn or damaged layer of two-part polyurethane/polyurea is removed prior to the step of applying the first layer of adhesive.

14. The method of claim 13 wherein:
    the portion of the worn or damaged layer of two-part polyurethane/polyurea is removed by grinding, buffing, or dissolving the worn or damaged portion.

15. A conveyor belt comprising:
    a generally flexible support member;
    a first layer of adhesive disposed on a first surface of the support member;
    a second layer of adhesive disposed on the first layer of adhesive; and
    a layer of two-part polyurethane/polyurea disposed on the second layer of adhesive.

16. The conveyor belt of claim 15 wherein:
    the generally flexible support member is comprised of a length of fabric and a layer of rubber that is disposed on said length of fabric.

17. The conveyor belt of claim 16 wherein:
    at least one of said first layer of adhesive and second layer of adhesive is comprised of a cement that includes an isocyanate part and a curable rubber part.

18. The conveyor belt of claim 17 wherein:
    the layer of two-part polyurethane/polyurea is approximately ¼ to ¾ of one inch in thickness.

19. The conveyor belt of claim 17 wherein:
    the layer of two-part polyurethane/polyurea has a durometer reading of between approximately 65 and 75 Shore A.

20. The conveyor belt of claim 19 wherein:
    the layer of two-part polyurethane/polyurea comprises ORPC 70-HA.

* * * * *